(12) United States Patent
Lee et al.

(10) Patent No.: US 11,338,236 B2
(45) Date of Patent: May 24, 2022

(54) AIR FILTRATION MONITORING BASED ON THERMOELECTRIC DEVICES

(71) Applicant: 3M INNOVATIVE PROPERTIES COMPANY, St. Paul, MN (US)

(72) Inventors: Jae Yong Lee, Santa Clara, CA (US); Mahmut Aksit, Woodbury, MN (US); Ravi Palaniswamy, Choa Chu Kang (SG); Antonny E. Flor, Sembawang (SG); James F. Poch, New Richmond, WI (US); Michael A. Meis, Cushing, MN (US); Alejandro Aldrin A. Narag, II, Choa Chu Kang (SG); Siang Sin Foo, Sin Ming Walk (SG); Donato G. Caraig, Bukit Panjang (SG)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 302 days.

(21) Appl. No.: 16/609,005

(22) PCT Filed: Apr. 19, 2018

(86) PCT No.: PCT/IB2018/052730
§ 371 (c)(1),
(2) Date: Oct. 28, 2019

(87) PCT Pub. No.: WO2018/198001
PCT Pub. Date: Nov. 1, 2018

(65) Prior Publication Data
US 2020/0054979 A1 Feb. 20, 2020

Related U.S. Application Data

(60) Provisional application No. 62/584,261, filed on Nov. 10, 2017, provisional application No. 62/491,452, filed on Apr. 28, 2017.

(51) Int. Cl.
*B01D 46/10* (2006.01)
*B01D 46/46* (2006.01)
(Continued)

(52) U.S. Cl.
CPC ......... *B01D 46/0086* (2013.01); *B01D 46/10* (2013.01); *B01D 46/448* (2013.01)

(58) Field of Classification Search
CPC .... B01D 46/10; B01D 46/46; B01D 46/0086; B01D 46/448; B01D 53/0454;
(Continued)

(56) References Cited

U.S. PATENT DOCUMENTS 4,040,042 A 8/1977 Mayer
4,050,291 A 9/1977 Nelson
(Continued)

FOREIGN PATENT DOCUMENTS

DE 10 2005 055464 A1 A1 11/2006
EP 3 358 333 A1 8/2018
(Continued)

OTHER PUBLICATIONS

International Search Report for PCT International Application No. PCT/IB2018/052730, dated Nov. 16, 2018, 3 pages.

*Primary Examiner* — Minh Chau T Pham
(74) *Attorney, Agent, or Firm* — Yufeng Dong

(57) ABSTRACT

Systems and methods for monitoring the status of air filters are provided. One or more thermoelectric sensors are provided to have an upstream sensing surface positioned adjacent the inlet surface of the air filter, and a downstream sensing surface positioned adjacent the outlet surface of the air filter. Sensing circuitry are connected to the thermoelectric sensors, configured to receive signals from the thermoelectric sensors and process the signals to obtain status information of the air filter.

20 Claims, 14 Drawing Sheets

(51) Int. Cl.
*H01M 8/04089* (2016.01)
*G11B 9/10* (2006.01)
*B01D 46/00* (2022.01)
*B01D 46/44* (2006.01)

(58) Field of Classification Search
CPC .............. F02M 35/024; A62B 18/088; H01M 8/04089; G11B 9/10; G01F 1/6847
USPC ....... 55/385.1, DIG. 34; 73/204.26, 861.355; 252/500; 257/719
See application file for complete search history.

(56) References Cited

U.S. PATENT DOCUMENTS

| | | | |
|---|---|---|---|
| 4,240,072 A | 12/1980 | Fowler | |
| 5,429,649 A | 7/1995 | Robin | |
| 5,668,535 A | 9/1997 | Hendrix | |
| 6,110,260 A | 8/2000 | Kubokawa | |
| 6,894,620 B2 | 5/2005 | Reinhardt | |
| 7,261,762 B2 | 8/2007 | Kang | |
| 7,713,339 B2 | 5/2010 | Johansson | |
| 7,749,303 B2* | 7/2010 | Wright | B01D 53/0454 95/8 |
| 8,029,608 B1 | 10/2011 | Breslin | |
| 8,388,717 B2 | 3/2013 | Livingstone | |
| 8,539,778 B2 | 9/2013 | Hofhaus | |
| 8,986,427 B2 | 3/2015 | Hauville | |
| 9,120,043 B2 | 9/2015 | Johansson | |
| 9,186,609 B2 | 11/2015 | Sherman, III | |
| 9,207,727 B2 | 12/2015 | Balogh | |
| 9,366,448 B2 | 6/2016 | Dean-Hendericks | |
| 9,931,591 B2* | 4/2018 | Galsim | B01D 46/46 |
| 10,213,629 B2* | 2/2019 | Tobias | A62B 18/088 |
| 10,821,388 B2* | 11/2020 | Alderman | B01D 46/10 |
| 11,156,192 B2* | 10/2021 | Clark | F02M 35/024 |
| 2002/0121137 A1* | 9/2002 | Fujiwara | H01M 8/04089 73/204.26 |
| 2004/0145049 A1* | 7/2004 | McKinnell | G11B 9/10 257/719 |
| 2005/0160833 A1* | 7/2005 | Gerhardt | G01F 1/6847 73/861.355 |
| 2007/0034838 A1* | 2/2007 | Imaoka | H01L 35/16 252/500 |
| 2007/0277592 A1 | 12/2007 | Johansson | |
| 2011/0185895 A1* | 8/2011 | Freen | G01N 15/08 95/25 |
| 2013/0197829 A1 | 8/2013 | Sherman et al. | |
| 2013/0325368 A1 | 12/2013 | Robb | |
| 2014/0083292 A1 | 3/2014 | Weiden | |
| 2016/0349117 A1 | 12/2016 | Castro et al. | |

FOREIGN PATENT DOCUMENTS

| | | |
|---|---|---|
| JP | 03-207425 | 9/1991 |
| JP | H05 123521 A | 5/1993 |
| JP | 2017 067761 A | 4/2017 |
| WO | WO 2011-075570 | 6/2011 |
| WO | WO 2012-066453 | 5/2012 |
| WO | WO 2017-222853 | 12/2017 |
| WO | WO 2017-222862 | 12/2017 |
| WO | WO 2017-223278 | 12/2017 |
| WO | WO 2018/031403 A1 | 2/2018 |
| WO | WO 2018-031406 | 2/2018 |
| WO | WO 2018-178821 | 10/2018 |
| WO | WO 2019-111133 | 6/2019 |

* cited by examiner

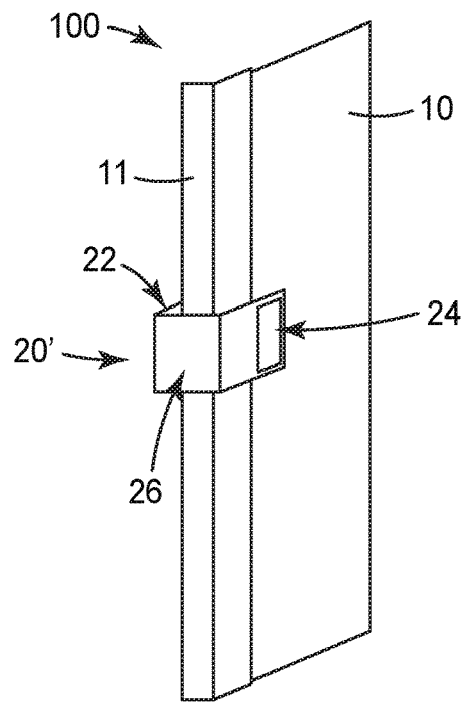
FIG. 3A
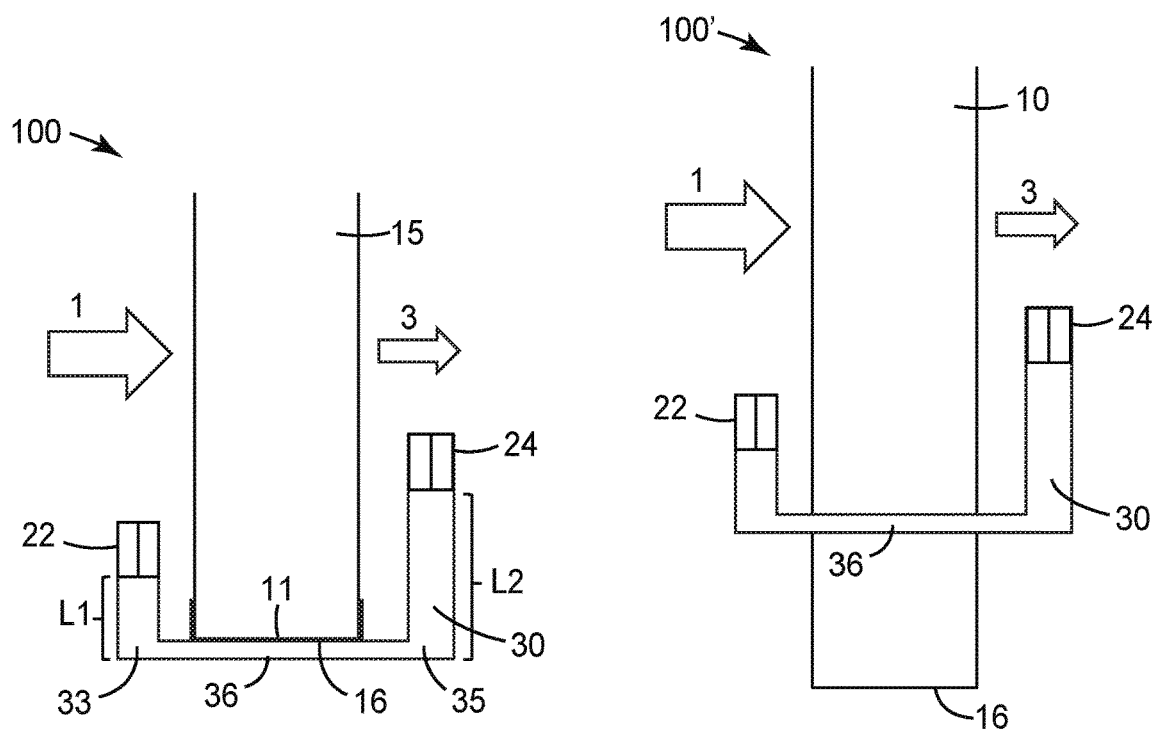
FIG. 3B
FIG. 3C

AIR FILTRATION MONITORING BASED ON THERMOELECTRIC DEVICES

CROSS REFERENCE TO RELATED APPLICATIONS

This application is a national stage filing under 35 U.S.C. 371 of PCT/IB2018/052730, filed Apr. 19, 2018, which claims the benefit of U.S. Application No. 62/491,452, filed Apr. 28, 2017, and U.S. Application No. 62/584,261, filed Nov. 10, 2017, the disclosure of which is incorporated by reference in its/their entirety herein.

TECHNICAL FIELD

The present disclosure relates to systems and methods for monitoring air filtration based on thermoelectric devices.

BACKGROUND

Air filters are widely used in furnaces, stand-alone air purifiers, etc. Air is drawn through the filter, and the filter traps particles, preventing them from proceeding through ducts. Air filters may become ineffective or blocked over time and need to be replaced.

SUMMARY

There is a desire to monitoring the status of an air filter so as to determine the right time to replace or repair the air filter. The present disclosure provides systems and methods for monitoring air filtration based on thermoelectric devices.

In one aspect, the present disclosure describes an air filtration apparatus including an air filter having an inlet surface and an outlet surface. The air filter is configured to filter air flowing therethrough from the inlet surface to the outlet surface. One or more thermoelectric sensors have an upstream sensing surface and a downstream sensing surface. The upstream sensing surface is positioned adjacent the inlet surface of the air filter, and the downstream sensing surface is positioned adjacent the outlet surface of the air filter. Sensing circuitry is connected to the one or more thermoelectric sensors, configured to receive signals from the thermoelectric sensors, and process the signals to obtain status information of the air filter.

In another aspect, the present disclosure describes an air filtration apparatus including an air filter having an inlet surface and an outlet surface. The air filter is configured to filter air flowing therethrough from the inlet surface to the outlet surface. A first thermoelectric sensor has an upstream sensing surface and a second thermoelectric sensor has a downstream sensing surface. The upstream sensing surface is positioned adjacent the inlet surface of the air filter, and the downstream sensing surface is positioned adjacent the outlet surface of the air filter. Sensing circuitry is connected to the first and second thermoelectric sensors, configured to receive signals from the thermoelectric sensors, and process the signals to obtain status information of the air filter.

In another aspect, the present disclosure describes an air filtration apparatus including an air filter having an inlet surface and an outlet surface. The air filter is configured to filter air flowing therethrough from the inlet surface to the outlet surface. A thermoelectric sensor has an upstream sensing surface and a downstream sensing surface. The upstream sensing surface is positioned adjacent the inlet surface of the air filter, and the downstream sensing surface is positioned adjacent the outlet surface of the air filter. Sensing circuitry is connected to the thermoelectric sensor, configured to receive signals from the thermoelectric sensor, and process the signals to obtain status information of the air filter.

In yet another aspect, the present disclosure describes a method of obtaining status information of an air filter. The method includes providing one or more thermoelectric sensors having an upstream sensing surface and a downstream sensing surface. The upstream sensing surface is positioned adjacent the inlet surface of the air filter, and the downstream sensing surface is positioned adjacent the outlet surface of the air filter. The method further includes obtaining, via the thermoelectric sensors, temperature-related information representative of the difference of air flow property between an upstream position adjacent the inlet surface and a downstream position adjacent the outlet surface, and processing, via sensing circuitry, the temperature-related information to obtain the status information of the air filter.

Various unexpected results and advantages are obtained in exemplary embodiments of the disclosure. One such advantage of exemplary embodiments of the present disclosure is that the status of an air filter can be monitored in real time. This is achieved by applying one or more thermoelectric sensors to detect the air flow properties at the upstream and downstream sides of an air filter. In some embodiments, the sensors can be made with low cost, disposable along with the air filter.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which:

FIG. 3A illustrates a side perspective view of an air filtration apparatus including the air filtration sensor of FIG. 2A, according to one embodiment.

FIG. 3B illustrates a cross-sectional view of the air filtration apparatus of FIG. 3A.

FIG. 3C illustrates a cross-sectional view of an air filtration apparatus including the air filtration sensor of FIG. 2A, according to another embodiment.

Figure 1:
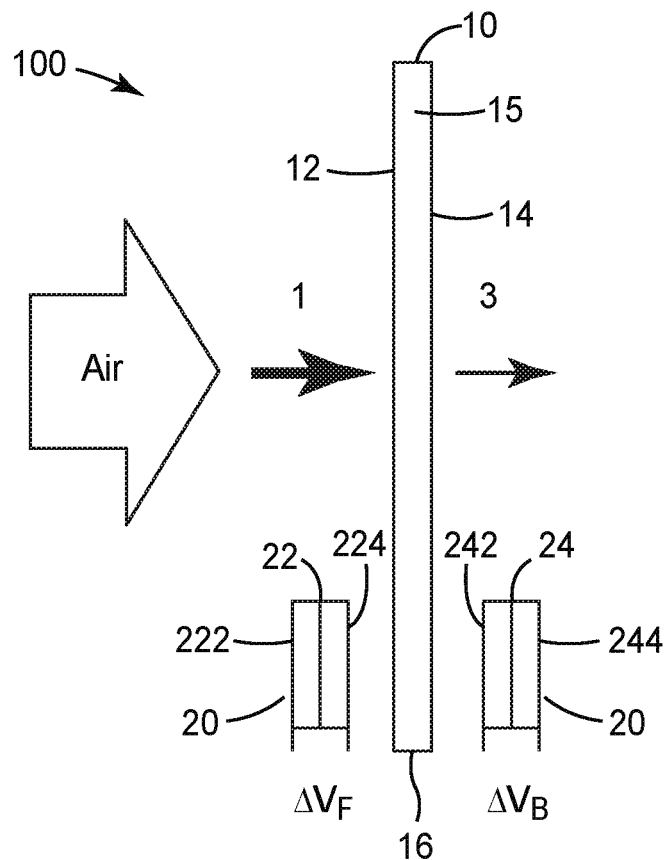
FIG. 1 illustrates a schematic view of an air filtration apparatus, according to one embodiment.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

The present disclosure provides systems and methods for systems and methods for monitoring air filtration based on thermoelectric devices. In some embodiments, the status of an air filter can be monitored in real time. This is achieved by applying one or more thermoelectric sensors to detect the air flow properties at the upstream and downstream sides of an air filter. In some embodiments, the sensors can be made with low cost, disposable along with the air filter.

FIG. 1 illustrates a schematic view of an air filtration apparatus 100, according to one embodiment. The filtration apparatus 100 includes an air filter 10 and an air filtration sensor 20 attached to the air filter 10 to obtain the status information of the air filter 10. The air filter 10 includes filter media 15, an inlet surface or upstream face 12, and an outlet surface or downstream face 14. The filter media 15 can filter an air flow therethrough from the inlet surface 12 to the outlet surface 14. The filter media 15 may have its periphery 16 surrounded by an optional perimeter frame (e.g., a frame 11 in FIG. 3A). In some embodiments, the filter media may be replaceable by removing the filter media from the frame and replacing the filter media with new or reconditioned filter media. In some embodiments, the filter media 15 may be self-supported without a frame.

The filter media 15 can include any suitable sorbent(s) and exhibit sorbent functionality. The filter media 15 may become ineffective or blocked over time. Such blockage of filter media can be reflected by the upstream and downstream air flow properties. For example, the front air flow 1 may have a relatively higher velocity/density than the back air flow 3, and the velocity/density difference between the front air flow 1 and the back air flow 3 may increase with an increasing blockage of filter media 15.

The air filtration sensor 20 includes a first thermoelectric sensor 22 positioned adjacent the inlet surface 12 of the air filter 10, and a second thermoelectric sensor 24 positioned adjacent the outlet surface 14 of the air filter 10. The air filtration sensor 20 can be supported, for example, by a hanging structure as shown in FIGS. 3A-C, which will be described further below.

The first thermoelectric sensor 22 has an upstream sensing surface 222 configured to be in thermal contact and heat exchange with the front air flow 1 such that the first thermoelectric sensor 22 can generate a first electrical signal representing the front air flow properties (velocity, density, etc.). The second thermoelectric sensor 24 has a downstream sensing surface 242 configured to be in thermal contact and heat exchange with the back air flow 3 such that the second thermoelectric sensor 24 can generate a second electrical signal representing the back air flow properties (velocity, density, etc.).

In the depicted embodiment of FIG. 1, the upstream sensing surface 222 faces the front air flow 1, and the downstream sensing surface 242 faces the back air flow 3. It is to be understood that the general direction of an air flow may vary according to the configuration of the air filter; the orientation of the sensing surfaces (e.g., 222 and 242) can be adjusted accordingly to optimize heat dissipation, via the air flow, at the respective sensing surfaces.

The thermoelectric sensors described herein can include any suitable thermoelectric elements, modules, or their combinations that can exhibit thermoelectric effect (e.g., conversion of thermal energy to electric energy and vice versa). Exemplary thermoelectric elements may include, for example, n-type semiconductors, p-type semiconductors, thermocouples, etc. In the depicted embodiment of FIG. 1, the first thermoelectric sensor 22 measures the temperature gradient between the front surface 222 and the back surface 224 thereof by generating a voltage difference $\Delta V_F$; the second thermoelectric sensor 24 measures the temperature gradient between the front surface 242 and the back surface 244 thereof by generating a voltage difference $\Delta V_B$. It is to be understood that the thermoelectric sensor can generate any suitable electrical signals such as, for example, voltage, current, etc. The electrical signals contain temperature-related information representative of the difference between an upstream air flow property at the upstream position and a downstream air flow property at the downstream position.

The air filtration sensor 20 may include sensing circuitry (not shown in FIG. 1) functionally connected to the first and second thermoelectric sensors 22 and 24. The sensing circuitry can receive signals from the thermoelectric sensors, and process the signals to obtain temperature-related information reflecting the difference between the properties (e.g., velocity, density, etc.) of the front air flow 1 and the back air flow 3, which in turn, reflects the blockage status of the air filter media 15.

The air filtration sensor 20 includes the upstream sensing surface 222 and the downstream sensing surface 242 configured to simultaneously measure the air flow properties (e.g., velocity, density, etc.) at the upstream position and downstream position of the air filter 10. The difference between the upstream position and downstream position can reflect the blockage status of the air filter media 15 of the air filter 10.

Figure 2A:
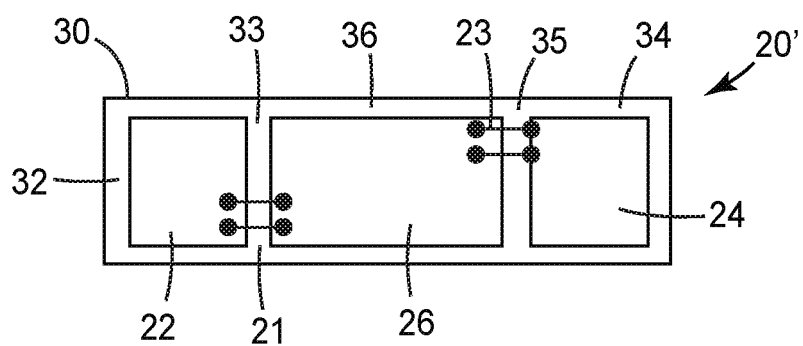
FIG. 2A illustrates a top view of an air filtration sensor, according to one embodiment.

FIG. 2A illustrates a top view of an air filtration sensor 20', according to one embodiment. The air filtration sensor 20' includes the first and second thermoelectric sensors 22 and 24, and sensing circuitry 26 supported by a substrate 30. The sensing circuitry 26 are electrically connected to the first and second thermoelectric sensors 22 and 24 by connectors 21 and 23. The first and second thermoelectric sensors 22 and 24 are disposed on the opposite ends 32 and 34 of the substrate 30. The sensing circuitry 26 is disposed between the first and second thermoelectric sensors 22 and 24, and supported by an off-center portion 36 of the substrate 30.

In some embodiments, the thermoelectric sensors 22 and 24 can be formed by integrating thermoelectric elements or modules made of thermoelectric materials. In some cases, thermoelectric elements or modules can be printed or dispensed directly onto the substrate. In some embodiments, the thermoelectric elements or modules can be formed by printing of a thermoelectric material in paste form. In some embodiments, a very thin thermoelectric element or module can be formed, with a thickness in the range of, for example, 0.01 to 0.10 mm. In some embodiments, the thermoelectric sensors 22 and 24 can be formed by integrating commercially-available thermoelectric elements or modules such as, for example, thermoelectric solid chips onto the substrate.

The substrate 30 has first and second portions 33 and 35 respectively connecting the first and second thermoelectric sensors 22 and 24 to the sensing circuitry 26. The first and second portions 33 and 35 are bendable such that the first and second thermoelectric sensors 22 and 24 can face with respect to each other as shown in FIG. 3A. In some embodiments, the substrate 30 may be a flexible substrate made of any suitable materials such as, for example, polyethylene, polypropylene, cellulose, etc.

Figure 2B:
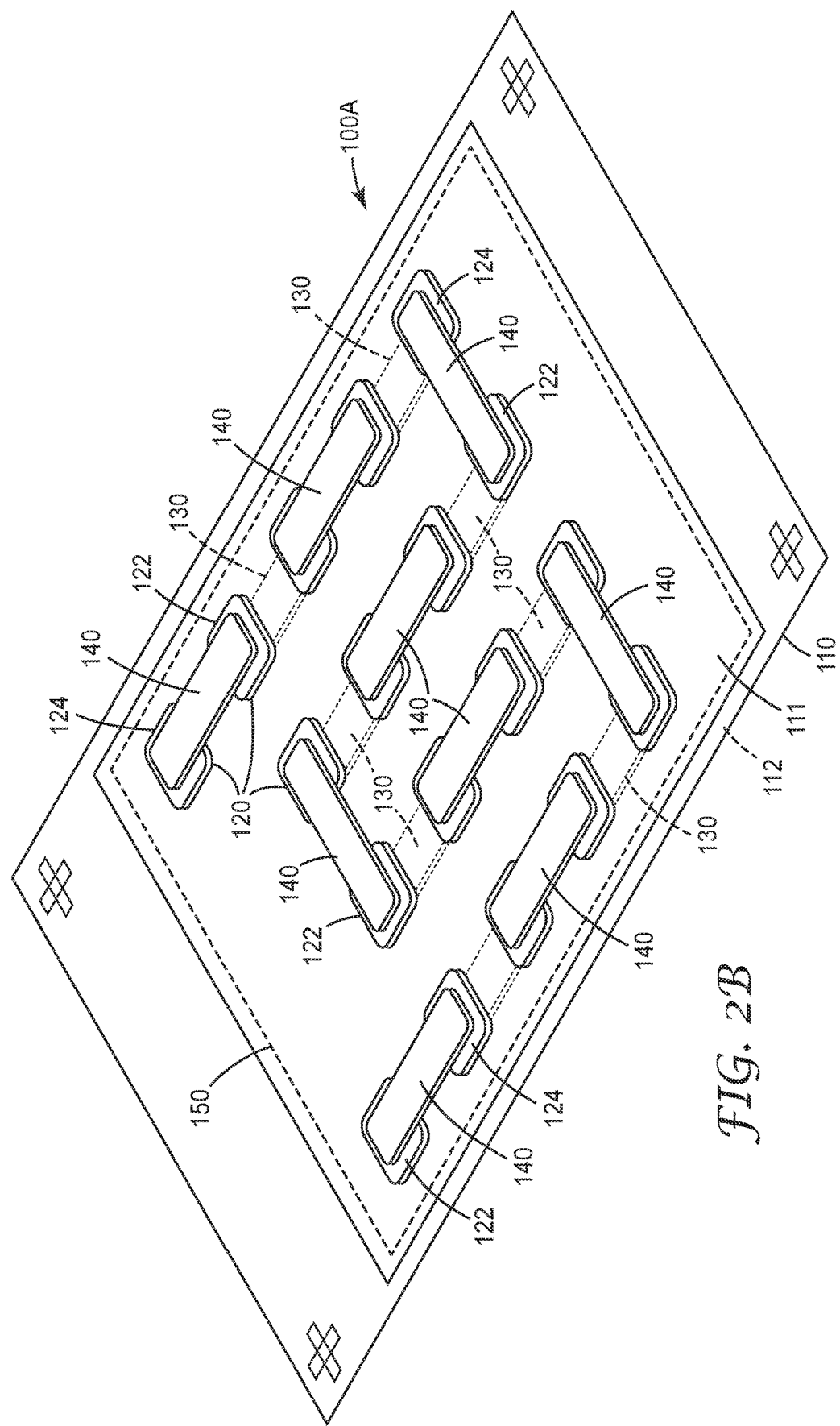
FIG. 2B illustrates a side perspective view of a thermoelectric sensor, according to one embodiment.

FIG. 2B illustrates a side perspective view of an exemplary thermoelectric module 100A that can be used to form the thermoelectric sensor 22 or 24 of FIG. 2A, according to one embodiment. The thermoelectric module 100A includes a substrate 110, multiple thermoelectric elements 120, a first set of connectors 130, and a second set of connectors 140. In the depicted embodiment, the thermoelectric elements 120 include p-type thermoelectric elements 122 and n-type thermoelectric elements 124. In some embodiments, the thermoelectric elements 120 may be formed by disposing (e.g., printing, dispensing, etc.) thermoelectric materials onto the substrate 110. In some embodiments, the thermoelectric elements 120 may be provided in the form of thermoelectric solid chips. The p-type thermoelectric elements 122 may be made of a p-type semiconductor material such as, for example, $Sb_2Te_3$ or its alloys. The n-type thermoelectric elements 124 may be made of an n-type semiconductor material such as, for example, $Bi_2Te_3$ or its alloys. Exemplary thermoelectric sensor modules and methods of making and using the same are described in U.S. Patent Application No. 62/353,752 (Lee et al.), which is incorporated herein by reference.

In some embodiments, the substrate 110 can be flexible. The substrate 110 has a first substrate surface 111 and a second substrate surface 112 opposite to the first substrate surface 111. The first set of connectors 130 are disposed on the first substrate surface 111; the second set of connectors 140 are disposed on the second substrate surface 112. The thermoelectric elements 120 are disposed between the first and second sets of connectors and have the opposite ends connected to the respective connectors. The first or second substrate surface 111 or 112 can be exposed to an air flow, in thermal contact and heat exchange with the air flow. In some embodiments, an optional, thermal-conductive adhesive layer 150 can be provided on the second substrate surface 112 to enhance the heat exchange. It is to be understood that any suitable techniques can be used to enhance the heat exchange between the air flow and one of the first and second substrate surfaces 111 or 112.

Figure 2C:
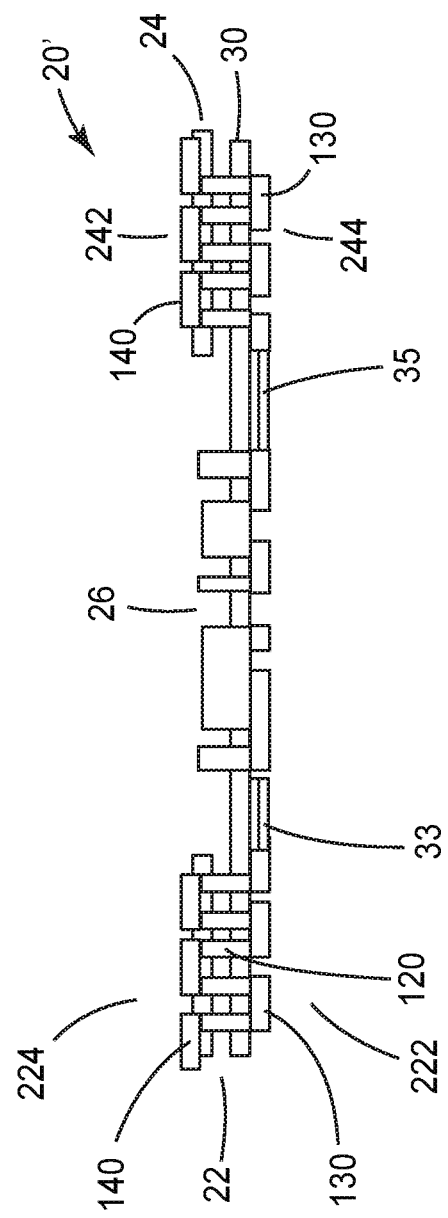
FIG. 2C illustrates a cross-sectional view of the air filtration sensor of FIG. 2A, according to one embodiment.

FIG. 2C illustrates a cross-sectional view of the air filtration sensor 20' of FIG. 2A. The first and second thermoelectric sensors 22 and 24 each can include a thermoelectric module such as the thermoelectric module 100A of FIG. 2B. In some embodiments, the air filtration sensor 20' can have the surface 222 of the first thermoelectric sensor 22, and the surface 242 of the second thermoelectric sensor 24 as the first and second sensing surfaces, respectively. The first thermoelectric sensor 22 can have the first set of conductors 130 on the first sensing surface 222 to be exposed to an air flow such as the front air flow 1 of FIG. 1, in thermal contact and heat exchange with the front air flow 1. The second thermoelectric sensor 24 can have the second set of conductors 140 on the second sensing surface 242 to be exposed to an air flow such as the back air flow 3 of the FIG. 1, in thermal contact and heat exchange with the back air flow 3.

In some embodiments, the surfaces (e.g., the surface 224 of sensor 22, and the surface 244 of sensor 24) of the thermoelectric sensors 22 and 24 that are opposite to the respective sensing surfaces (e.g., the sensing surface 222 of sensor 22, and the sensing surface 242 of sensor 24) can be thermally insulated from the surrounding air flow. For example, the first thermoelectric sensor 22 may have its surface 224 encapsulated to prevent heat exchange with the front air flow; the second thermoelectric sensor 24 may have its surface 244 encapsulated to prevent heat exchange with the back air flow.

In some embodiments, the first and second thermoelectric sensors 22 and 24 each can include a heating element disposed to heat the surface opposite to the sensing surface. For example, the first thermoelectric sensor 22 can include a heating element to heat the surface 224 that is opposite to the first sensing surface 222; the second thermoelectric sensor 24 can include a heating element to heat the surface 244 that is opposite to the second sensing surface 242. Any suitable heating elements can be used to heat the respective sensor surfaces.

FIG. 3A illustrates a side perspective view of the air filtration apparatus 100 including the air filtration sensor 20' of FIG. 2A, according to one embodiment. FIG. 3B illustrates a cross-sectional view of the air filtration apparatus 100 of FIG. 3A. The air filter 10 includes a frame 11 to hold the filter media 15. The air filtration sensor 20' is attached to the frame 11. The substrate 30 of the air filtration sensor 20' is bended along the portions 33 and 35 to form a hanging structure such that the first and second thermoelectric sensors 22 and 24 can have their respective sensing surfaces exposed to the front air flow 1 or the back air flow 3.

The air filtration sensor 20' can be mounted to the frame 11 in any suitable manners. In some embodiments, the portion of the substrate 30 supporting the sensing circuitry 26 can be attached to the frame 11 by adhesive. In some embodiments, the air filtration sensor 20' can be mounted to the frame 11 by a clapping mechanism.

In the depicted embodiment of FIG. 3B, the substrate 30 has the off-center portion 36 to support sensing circuitry. The off-center portion 36 is attached to the frame 11 of the air filter 10 such that the first and second thermoelectric sensors 22 and 24 are positioned to be offset with respect to the filter periphery 16, e.g., $L_2 > L_1$. The offset position can allow the second thermoelectric sensor 24 not being blocked by the first thermoelectric sensor 22, and thus can measure the back air properties more accurately.

FIG. 3C illustrates a cross-sectional view of an air filtration apparatus 100' including the air filtration sensor 20' of FIG. 2A, according to another embodiment. The substrate 30 of the air filtration sensor 20' is positioned across the filter media 15 instead of attaching to the periphery 16 of the air filter 10. It is to be understood that an air filtration sensor can be positioned at any locations of the air filter as long as (i) the upstream sensing surface is positioned adjacent the inlet surface of the air filter such that the upstream sensing surface is in thermal contact and heat exchange with the front air flow; and (ii) the downstream sensing surface is positioned adjacent the outlet surface of the air filter such that the downstream sensing surface is in thermal contact and heat exchange with the back air flow.

Figure 4A:
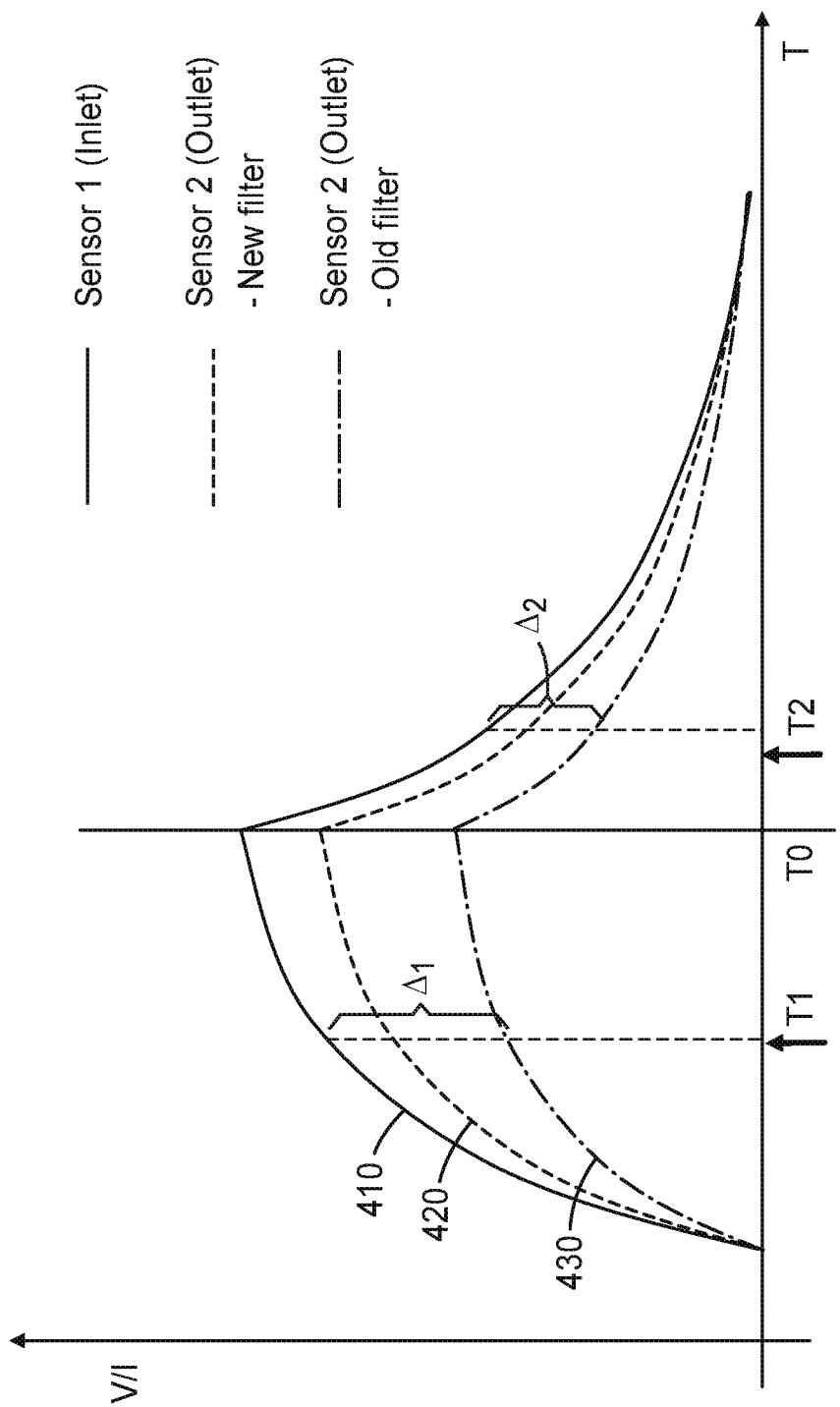
FIG. 4A illustrates measurement curves of thermoelectric sensors, according to one embodiment.
Figure 4B:
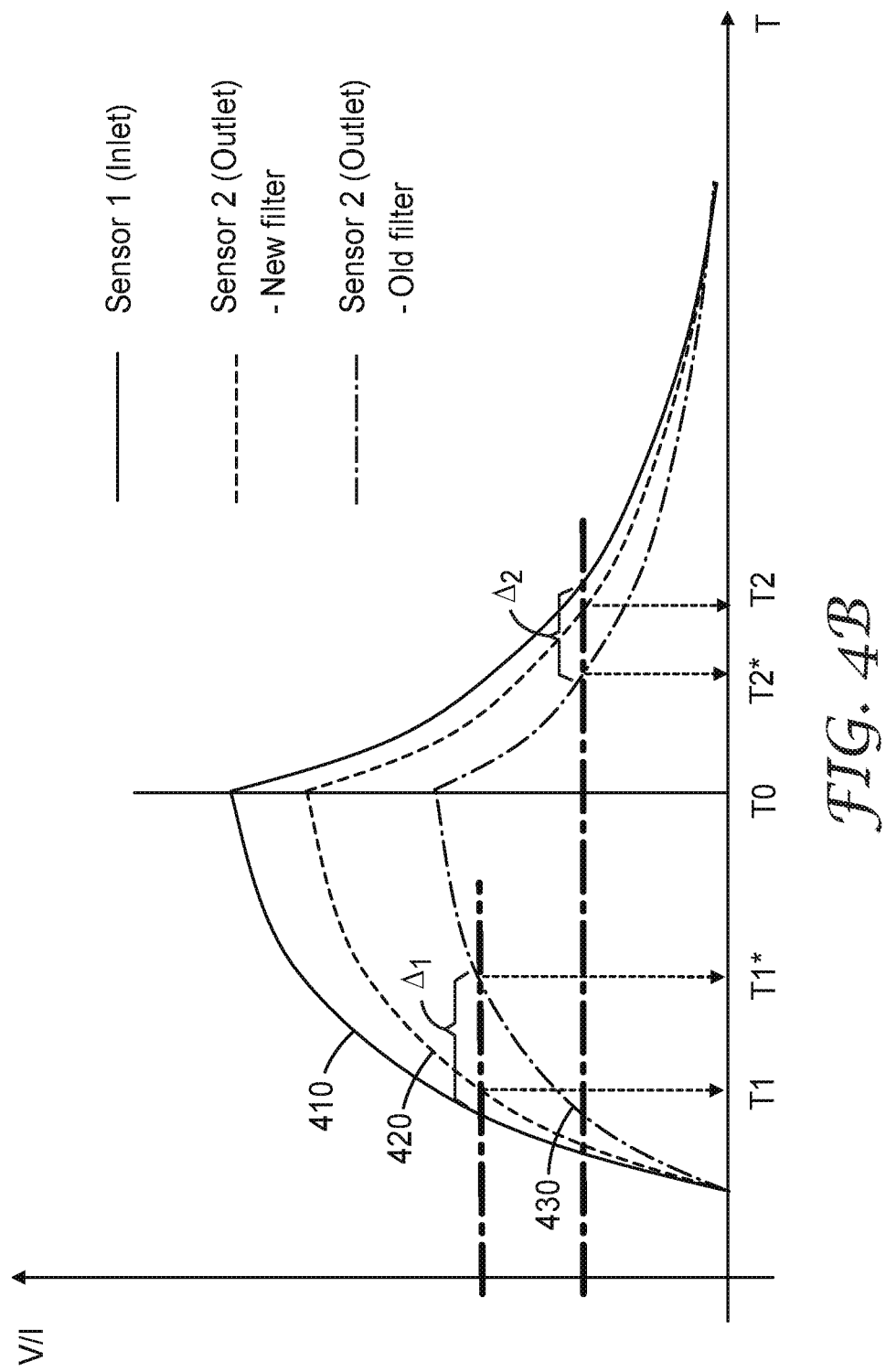
FIG. 4B illustrates measurement curves of thermoelectric sensors, according to another embodiment.

FIGS. 4A-4B illustrate measurement curves of the air filtration sensors described herein, according to one embodiment. Sensing circuitry such as the sensing circuitry 26 of FIG. 2A can receive voltage (V) or current (I) signals from the first thermoelectric sensor 22 and the second thermoelectric sensor 24. The first and second thermoelectric sensors 22 and 24 each include a heating element configured to heat the sensor surface opposite to the sensing surface. When heating operation is on, both the first and second sensors show rising curves in terms of electric voltage (V) or current level (I), which are followed by decaying curves when the heating is off at T0. The voltage or current signals can be measured as a function of time (T). Curves 410 and 420 are rising and decaying curves in operating the first sensor 22 positioned adjacent the inlet surface 12 and the second sensor 24 positioned adjacent the outlet surface 14 of a new air filter, respectively. Over time, the new air filter may become ineffective or blocked, and the curve 420 changes to a curve 430 which is measured by the second sensor 24 positioned adjacent the outlet surface 14 of the used air filter. The status of an air filter can be determined by analyzing the curves 410 and 430.

In some embodiments, the curves 410 and 420 can be simultaneously measured by the first and second sensors 22 and 24 when a new air filter is installed. To monitor the status of the air filter over time, the curves 410 and 430 can be simultaneously measured by the first and second sensors 22 and 24 during the use of the air filter. It is to be understood that the curve 410 may not be affected by the status of the air filter, but may depend on the status of the whole filtration system (e.g., the change of the front air flow 1 of FIG. 1). On the other hand, the curves from the second sensor 24 positioned at a downstream position of the air filter may change upon the status of the air filter (e.g., the curve 420 for a new air filter changes to the curve 430 over time). In FIG. 4A, at a specific time (T1 or T2), the difference ($\Delta_1$ or $\Delta_2$) of electric signal level (V or I) between the curves 410 and 430 can be compared with a preset threshold level. When the difference is beyond the threshold level, it is determined that the air filter needs to be replaced or repaired. In FIG. 4B, at a specific electric signal level, the difference ($\Delta_1$ or $\Delta_2$) of the elapsed time between the curves 410 and 430 can be compared with a preset threshold level. When the difference is beyond the threshold level, it is determined that the air filter needs to be replaced or repaired.

Figure 5A:
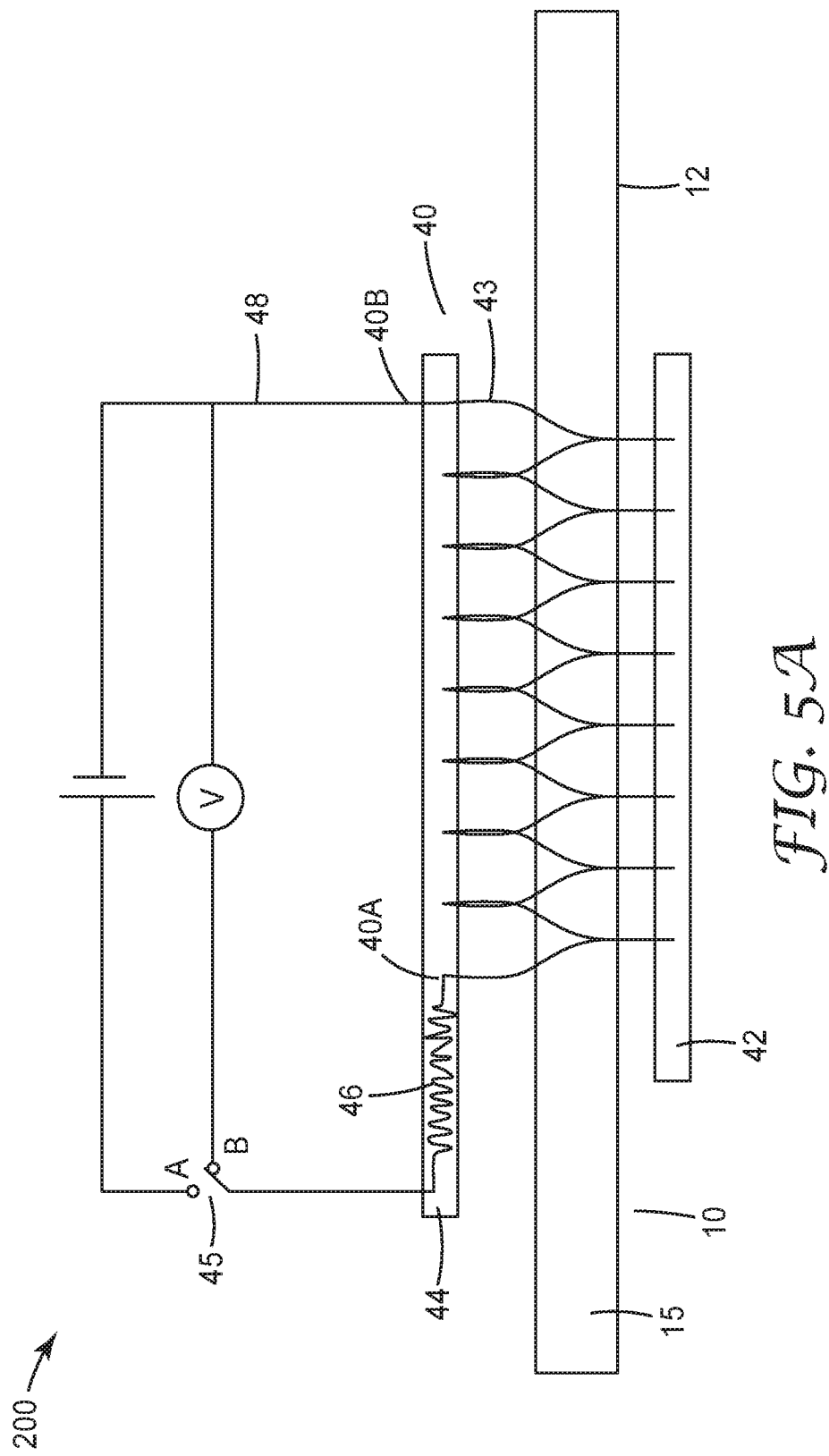
FIG. 5A illustrates a cross-sectional view of an air filtration apparatus including a thermocouple sensor, according to one embodiment.

FIG. 5A illustrates a cross-sectional view of an air filtration apparatus 200 including a thermocouple sensor 40, according to one embodiment. The air filtration apparatus 200 includes the air filter 10 and the thermocouple sensor 40 attached to the air filter 10. The thermocouple sensor 40 includes a first sensing surface 42 disposed adjacent the inlet surface 12 of the air filter 10 and a second sensing surface 44 disposed adjacent the outlet surface 14. In the depicted embodiment, the first and second sensing surfaces each include a heatsink. The heatsinks each may be made of thermally conductive materials such as, for example, metals, ceramics, etc.

The thermocouple sensor 40 further includes conductor wires 43 at least partially extending through the filtering media 15 of the air filter 10. The conductor wires 43 can include two dissimilar conductors forming electrical junctions in series, thermally connected to the opposite heatsinks 42 and 44. In some embodiments, the conductor wires 43 can include pairs of metals or alloys such as, for example, chormel-alumel pairs. It is to be understood that any suitable types of thermocouples can be used. Typical thermocouples include, for example, Type E (chromel-constantan), Type J (iron-constantan), Type K (chromel-alumel), Type M (82% Ni/18% Mo-99.2% Ni/0.8% Co, by weight), Type N (Nicrosil-Nisil), Type T (copper-constantan), Type B (70% Pt/30% Rh-94% Pt/6% Rh, by weight), Type R (87% Pt/13% Rh—Pt, by weight), Type S (90% Pt/10% Rh—Pt, by weight), Type C (95% W/5% Re-74% W/26% Re, by weight), Type D (97% W/3% Re-75% W/25% Re, by weight), etc.

The thermocouple sensor 40 can measure the temperature difference between the first and second sensing surfaces 42 and 44 as a voltage drop or current level at the electrical junctions in real time. In the depicted embodiment, the thermocouple sensor 40 further includes a heating element 46 disposed to heat the second heatsink 44. The heating element 46 is connected to the conductor wires 43 in series. The thermocouple sensor 40 is connected to sensing circuitry 48 including a switch 45. When the switch 45 is at position A, the heatsink 44 can be heated by the heating element 46. The current that passes through the thermocouple wires 43 and the heating element 46 can cause the heating element 46 to generate heat and increase the temperature at the heatsink 44. When the switch 45 is at the position B, the voltage drop at the electrical junctions 40A and 40B of the thermocouple sensor 40 due to thermoelectric effect can be measured by the circuitry 48.

In the depicted embodiment, the first sensing surface 42 is disposed at an upstream position of the air filter 10; the second sensing surface 44 is disposed at a downstream position of the air filter 10. The thermocouple sensor 40 is configured to have the first sensing surface 42 and the second sensing surface 44 to simultaneously measure the air flow properties (e.g., velocity, density, etc.) at the upstream position and downstream position of the air filter 10, respectively. The difference of the air flow properties between the upstream position and downstream position can reflect the blockage status of the air filter media 15 of the air filter 10.

Figures 5B, 6:
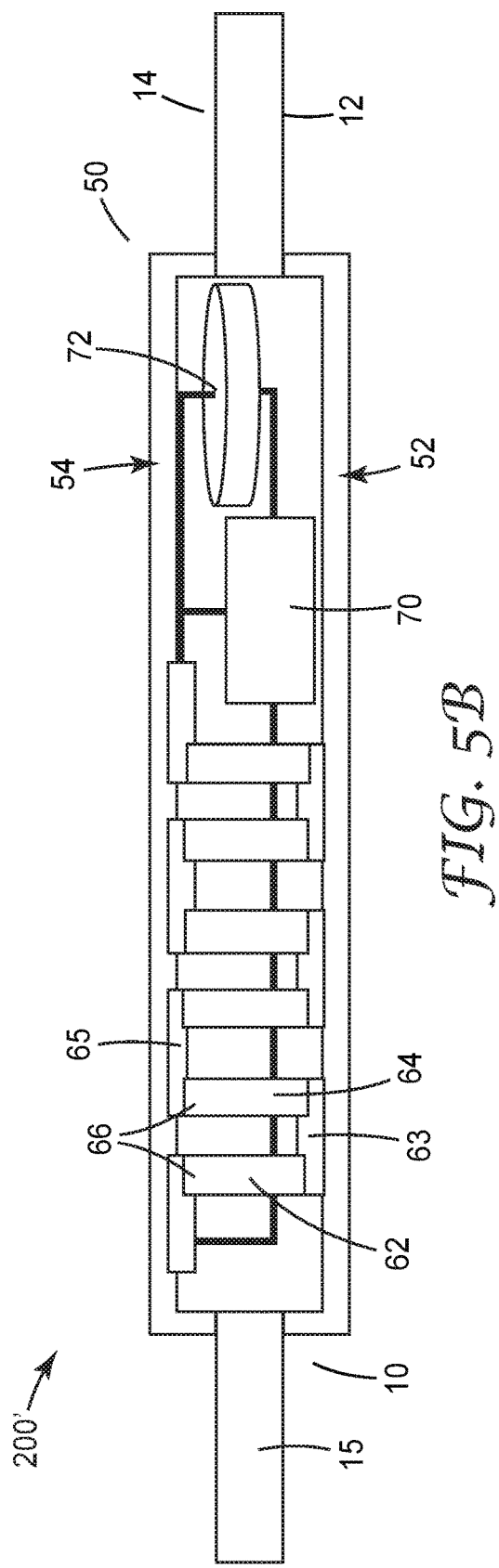
FIG. 5B illustrates a cross-sectional view of an air filtration apparatus including a thermoelectric sensor, according to another embodiment.
FIG. 6 is a flow diagram of a method for obtain the status information of an air filter, according to one embodiment.

FIG. 5B illustrates a cross-sectional view of an air filtration apparatus 200' including a thermoelectric sensor 50, according to another embodiment. The air filtration apparatus 200' includes the air filter 10 and the thermoelectric sensor 50 attached to the air filter 10. The thermoelectric sensor 50 includes a first sensing surface 52 disposed adjacent the inlet surface 12 of the air filter 10 and a second sensing surface 54 disposed adjacent the outlet surface 14. In the depicted embodiment, the first and second sensing surfaces each include a heat exchange plate. The heat exchange plates 52 and 54 each may be made of thermally conductive materials such as, for example, metals, ceramics, etc. In some embodiments, the heat exchange plates may form an air-tight engagement with the air filter 10.

The thermoelectric sensor 50 further includes multiple thermoelectric elements 66 at least partially extending through the filtering media 15 of the air filter 10. The thermoelectric elements 66 include p-type thermoelectric elements 62 and n-type thermoelectric elements 64 connected by connectors 63 and 65, respectively. The connectors 63 and 65 are in thermal connection to the heat exchange plates 52 and 54, respectively.

The p-type thermoelectric elements 62 may be made of a p-type semiconductor material such as, for example, $Sb_2Te_3$ or its alloys. The n-type thermoelectric elements 64 may be made of an n-type semiconductor material such as, for example, $Bi_2Te_3$ or its alloys. In some embodiments, the thermoelectric elements 66 may be provided in the form of thermoelectric solid chips.

The thermoelectric sensor 50 further includes sensing circuitry 70 connected to the thermoelectric elements 66, configured to control the measurement of the temperature difference between the first and second sensing surfaces 52 and 54 as a voltage drop or current level at the electrical junctions. In the depicted embodiment, the thermoelectric sensor 50 further includes a battery 72 to power the sensing circuitry and an optional heating element (not shown) disposed to heat the second heat exchange plate 54. The heating element can be attached to the second heat exchange plate 54.

In the depicted embodiment, the first sensing surface 52 is disposed at an upstream position of the air filter 10; the second sensing surface 54 is disposed at a downstream position of the air filter 10. The thermoelectric sensor 50 is configured to have the first sensing surface 52 and the second sensing surface 54 to simultaneously measure the air flow properties (e.g., velocity, density, etc.) at the upstream position and downstream position of the air filter 10, respectively. The difference of the air flow properties between the upstream position and downstream position can reflect the blockage status of the air filter media 15 of the air filter 10.

FIG. 6 is a flow diagram of a method 600 for obtain the status information of an air filter, according to one embodiment. The method 600 can be implemented by any of the air filtration apparatus described herein. At 610, one or more thermoelectric sensors are provided to have an upstream sensing surface and a downstream sensing surface. The upstream sensing surface is positioned at an upstream position of the air filter, and the downstream sensing surface is positioned at a downstream position of the air filter. The upstream sensing surface can be, for example, the first sensing surface 222 of FIG. 1, the first sensing surface 42 of FIG. 5A, the first sensing surface 52 of FIG. 5B, etc. The downstream sensing surface can be, for example, the second sensing surface 242 of FIG. 1, the second sensing surface 44 of FIG. 5A, the second sensing surface 54 of FIG. 5B, etc. The method 600 then proceeds to 620.

At 620, temperature-related information is obtained via the thermoelectric sensors. The temperature-related information can be representative of the difference between an upstream air flow property (e.g., velocity, density, etc.) at the upstream position and a downstream air flow property at the downstream position. The thermoelectric sensors can be, for example, the thermoelectric sensors 22 and 24 of FIG. 1, the thermocouple 40 of FIG. 5A, the thermoelectric sensor 50 of FIG. 5B, etc. In some embodiments, the thermoelectric sensors include a first thermoelectric sensor (e.g., 22 of FIG. 1) and a second thermoelectric sensor (e.g., 24 of FIG. 1).

The temperature-related information can be obtained by simultaneously measuring electric output curves from the first and second thermoelectric sensors. In some embodiments, the thermoelectric sensors can measure the temperature difference between the upstream and downstream surfaces by outputting an electric signal (e.g., a voltage drop or current level). The method 600 then proceeds to 630.

At 630, the temperature-related information can be processed, via sensing circuitry, to obtain the status information of the air filter. The sensing circuitry can be, for example, the sensing circuitry 26 of FIG. 2A, the sensing circuitry 48 of FIG. 5A, the sensing circuitry 70 of FIG. 5B, etc. In some embodiments, the temperature-related information can be electric signals (e.g., a voltage drop, a current level, etc.) from the one or more thermoelectric sensors. The electric signals can be processed to determine the difference between the properties (e.g., velocity, density, etc.) of the front air flow and the back air flow, which in turn, reflects the blockage status of the air filter media.

Embodiments of Thermoelectric Sensor Having Heating Element

In some embodiments, the thermoelectric sensors described herein (e.g., the thermoelectric sensors 22 and 24 in FIG. 1) can include one or more heating elements disposed on a hot side of the thermoelectric sensors to heat the hot side. For example, the thermoelectric sensors 22 and 24 in FIG. 1 each can include a heating element to provide a constant heat source to the hot side thereof. E.g., the first thermoelectric sensor 22 can include a heating element to heat the surface 224 that is opposite to the first sensing surface 222; the second thermoelectric sensor 24 can include a heating element to heat the surface 244 that is opposite to the second sensing surface 242.

In some embodiments, the hot side of the thermoelectric sensors (e.g., the surface 224 of sensor 22, and the surface 244 of sensor 24) including the heating element can be thermally insulated from the surrounding air flow. For example, the thermoelectric sensor 22 may have its surface 224 encapsulated to prevent heat exchange with the front air flow; the thermoelectric sensor 24 may have its surface 244 encapsulated to prevent heat exchange with the back-air flow.

Figure 7A:
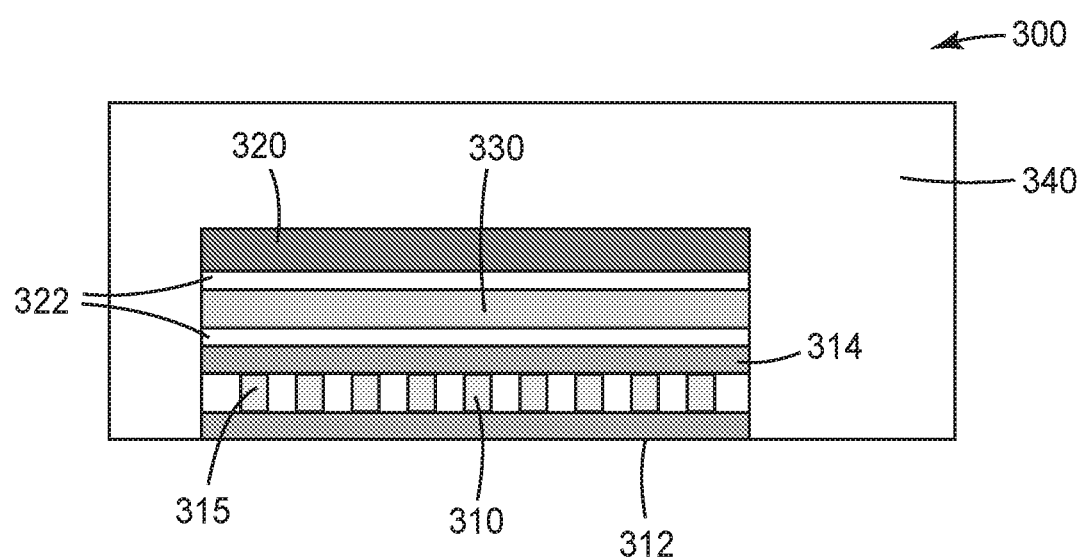
FIG. 7A is a cross-sectional view of a thermoelectric sensor including a heating element, according to one embodiment.

FIG. 7A is a schematic cross-sectional view of a thermoelectric sensor 300 including a heating element 320, according to one embodiment. The thermoelectric sensor 300 includes a thermoelectric circuitry 310 having opposite sides 312 and 314. An array of n-type and p-type thermoelectric elements 315 can be electrically connected by the respective electrodes at the sides 312 and 314 to form the thermoelectric circuitry 310. The heating element 320 is disposed adjacent to the hot side 314. The thermoelectric sensor 300 further includes a heat spreader layer 330 disposed between the heating element 320 and the hot side 314 of the thermoelectric module 310. One or more thermal interface materials 322 are provided at the interfaces between the heating element 320 and the heat spreader layer 330, and between the heat spreader layer 330 and the hot side 314, to uniformly distribute the heat. The thermoelectric sensor 300 can be encapsulated by a thermal insulation material 340, with the cool side 312 exposing to air.

In some embodiments, the heating element 320 can have a flexible circuit heater design. For example, the heating element 320 can be made by polyimide plus Au plated copper coil trace. In some embodiments, the heating element 320 can have a rigid circuit heater design. For example, the heating element 320 can be made by a printed circuit board (PCB) plus Au plated copper coil trace. It is to be understood that the heating element 320 may include any suitable heating circuitry that can generate heat.

In some embodiments, the heat spread layer 330 can include any suitable thermal conductive materials such as, for example, metals or metal alloys. For example, the heat spread layer 330 may include a layer of copper or aluminum material having a thickness in a range from about 100 to about 500 micrometers. In some embodiments, the thermal interface material 332 may include one or more pressure-sensitive adhesive (PSA) based materials such as, for example, thermally conductive adhesive tape materials commercially available from 3M Company (Saint Paul, Minn., USA). In some embodiments, the thermal insulation material 340 can include a thermally and electrically insulating material such as, for example, encapsulant epoxy. The heating element 320, the heat spread layer 330 and the thermal insulation material 340 can be disposed on the hot side 314 by any suitable processes such as, for example, lamination, molding, soldering, etc.

Figure 7B:
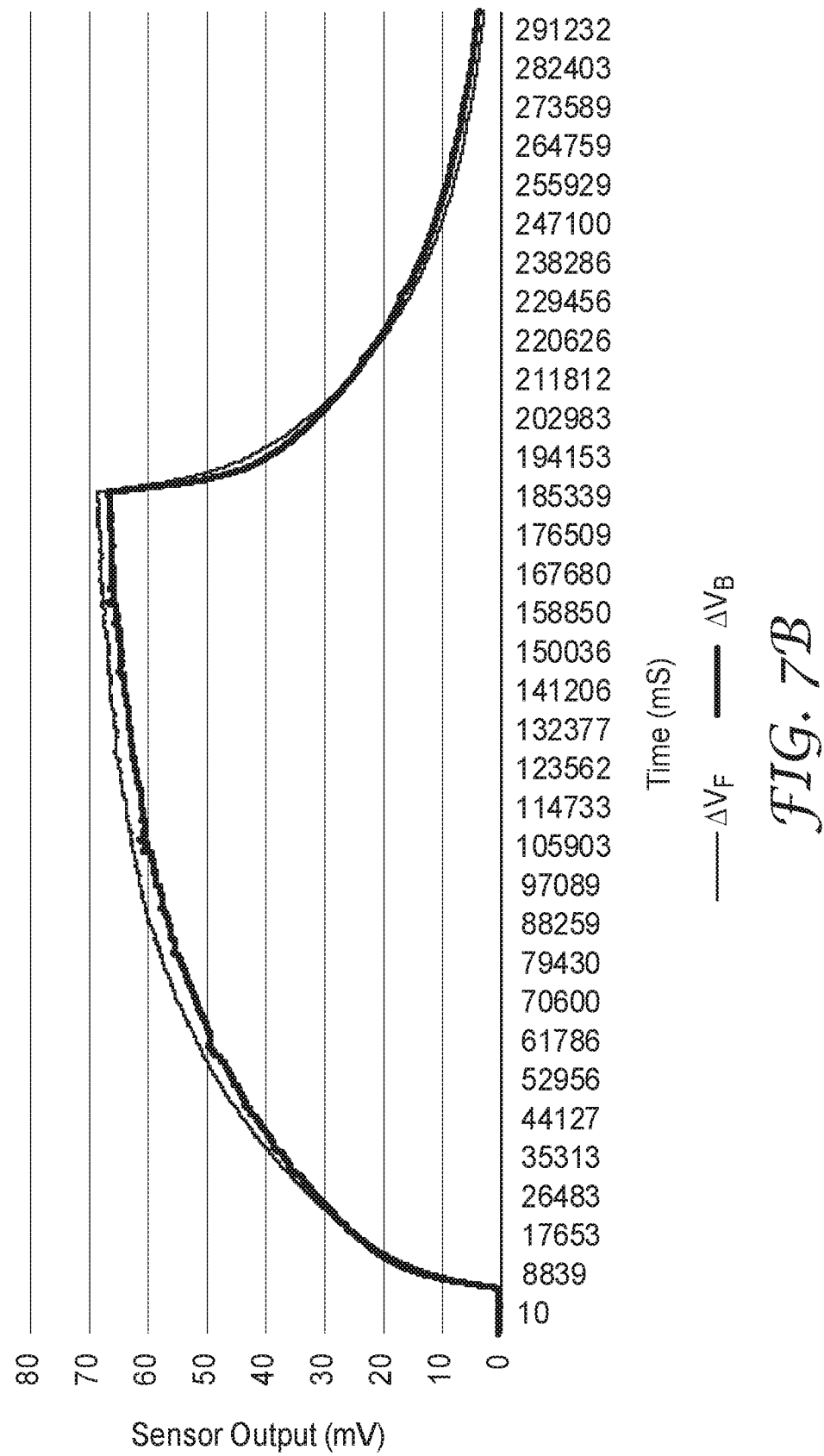
FIG. 7B illustrates measurement curves of the thermoelectric sensor of FIG. 7A for a "clean" air filter.
Figure 7C:
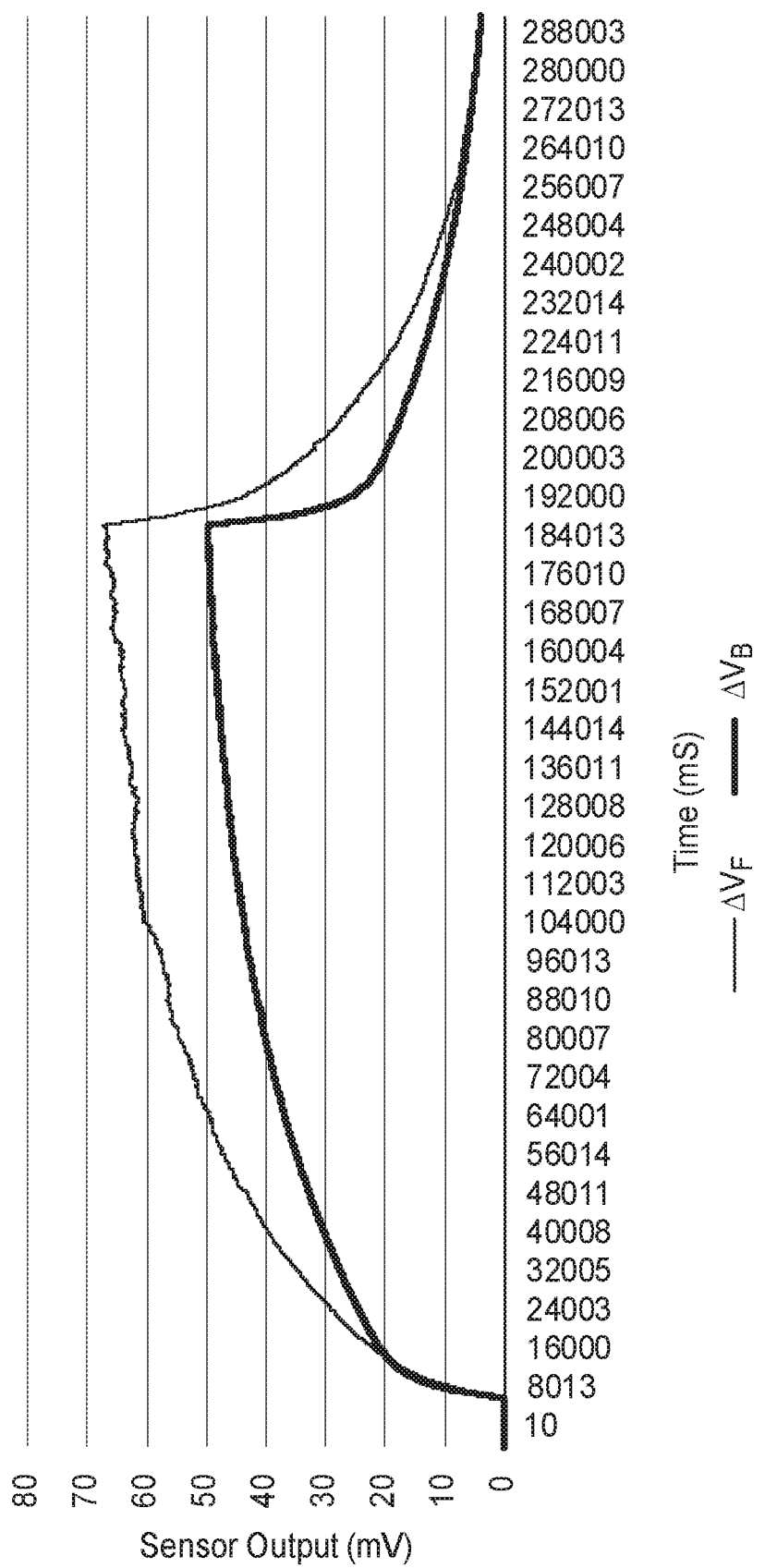
FIG. 7C illustrates measurement curves of the thermoelectric sensor of FIG. 7A for a clogged air filter.

One or more of the thermoelectric sensors 300 can be applied as an air filtration sensor to obtain the status information of an air filter. For example, the first and second thermoelectric sensors 22 and 24 in FIG. 1 each can include the thermoelectric sensor 300. The cool sides 312 of the thermoelectric sensors 300 can be exposed to the front and back air flows 1 and 3, respectively. The respective voltage differences $\Delta V_F$ and $\Delta V_B$ can be measured by any suitable circuits. FIGS. 7B-C illustrate measurement curves for voltage differences $\Delta V_F$ and $\Delta V_B$ of the thermoelectric sensor of FIG. 7A for a clean air filter and a clogged air filter, respectively. The voltage differences $\Delta V_F$ and $\Delta V_B$ in FIG. 7B were measured for a "clean" air filter; while in FIG. 7C, the voltage differences $\Delta V_F$ and $\Delta V_B$ were measured for a "clogged" air filter. For the "clean" air filter, the measured voltage differences $\Delta V_F$ and $\Delta V_B$ can be substantially the same (e.g., the difference between $\Delta V_F$ and $\Delta V_B$ being less than about 5 mV as shown in FIG. 7B). For the "clogged" air filter, the measured voltage difference between $\Delta V_F$ and $\Delta V_B$ can be at least 2 times, 3 times, 4 times or 5 times greater than that for a "clean" air filter (e.g., the difference between $\Delta V_F$ and $\Delta V_B$ being about 20 mV as shown in FIG. 7C).

Figure 8:
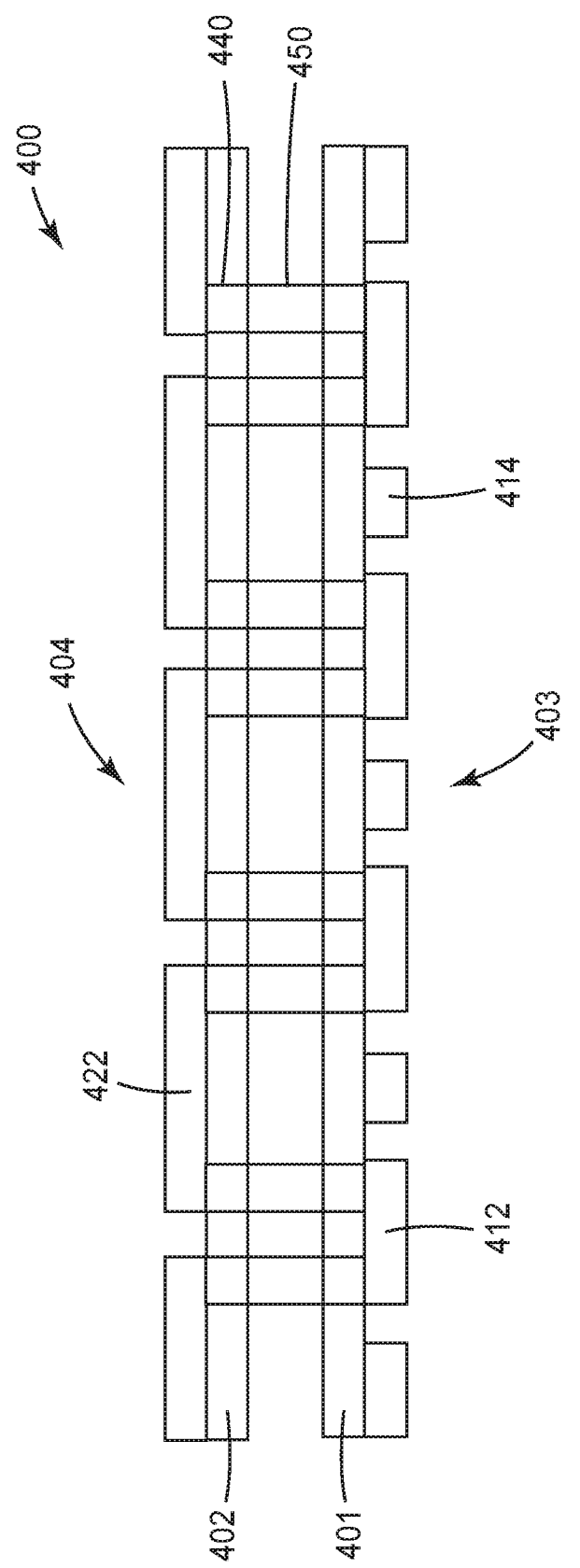
FIG. 8 is a cross-sectional view of a thermoelectric sensor including coplanar thermoelectric electrodes and heater electrodes, according to one embodiment.

In some embodiments, a thermoelectric sensor can include a heating element that is positioned on a hot side thereof, coplanar with thermoelectric electrodes. FIG. 8 is a schematic cross-sectional view of a thermoelectric sensor 400 including coplanar thermoelectric electrodes and heater electrodes, according to one embodiment. The thermoelectric sensor 400 includes a first flexible substrate 401, a second flexible substrate 402, an array of thermoelectric elements 450 disposed between the first and second flexible substrates 401 and 402, and a first set of electrodes 412 on the first flexible substrate 401 and a second set of electrodes 422 on the second flexible substrate 402 to electrically connect the array of thermoelectric elements 450. In the embodiment of FIG. 8, vertical or via conductors 440 (e.g., solder) are used to electrically connect the thermoelectric elements 450 to the respective first and second sets of electrodes 412 and 422. In this manner, the first and second flexible substrates 401 and 402 and the elements disposed thereon can be integrated into a single flexible thermoelectric device.

Figure 9A:
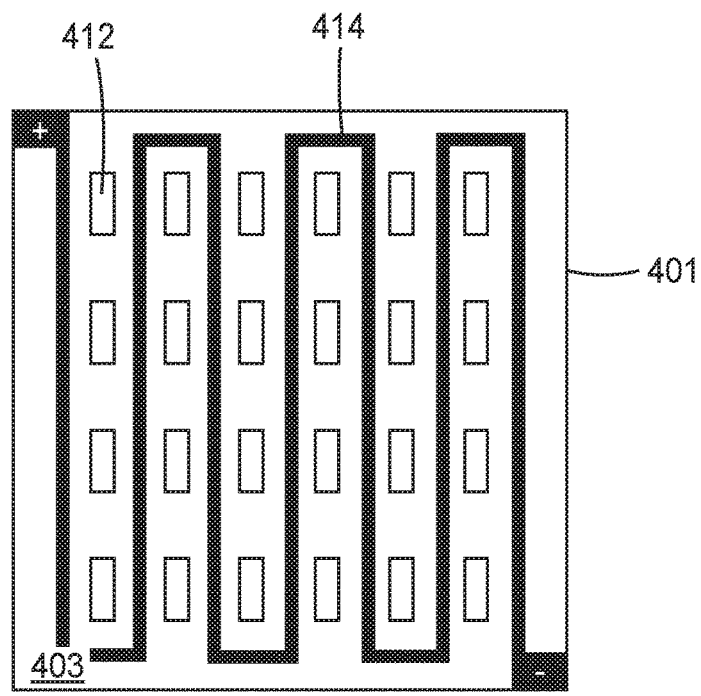
FIG. 9A is a top view of the thermoelectric sensor of FIG. 8 with a pattern of coplanar thermoelectric electrodes and heater electrodes, according to one embodiment.
Figure 9B:
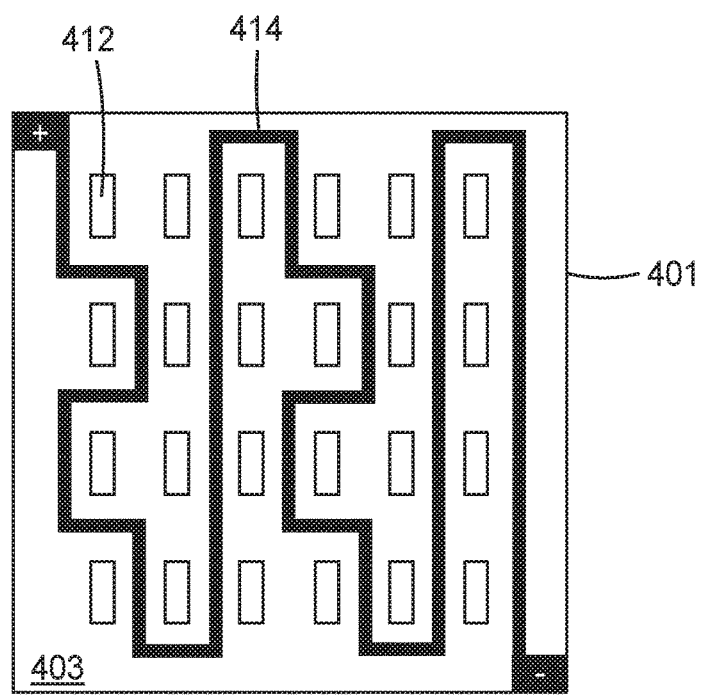
FIG. 9B is a top view of the thermoelectric sensor of FIG. 8 with a pattern of coplanar thermoelectric electrodes and heater electrodes, according to another embodiment.
Figure 9C:
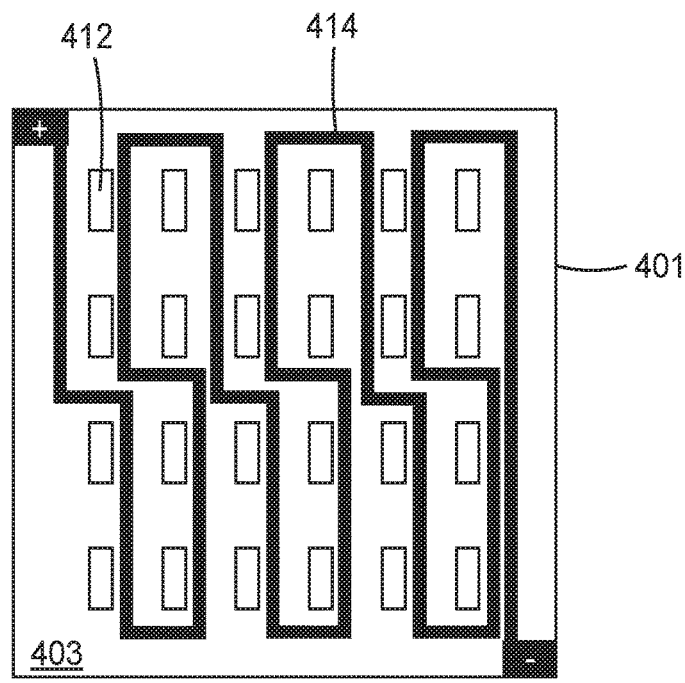
FIG. 9C is a top view of the thermoelectric sensor of FIG. 8 with a pattern of coplanar thermoelectric electrodes and heater electrodes, according to another embodiment.

The thermoelectric sensor 400 has opposite surfaces 402 and 404, one being a cool surface and the other being a hot surface. The heating element 414 includes a pattern of heater electrode disposed on the hot surface 403, coplanar with the first set of electrodes 412. FIGS. 9A-C are a top view of the thermoelectric sensor of FIG. 8 with various patterns of the coplanar thermoelectric electrode 412 and heater electrode 414, according to some embodiment. The pattern of heater electrode 414 can be directed disposed on the outer surface of the first flexible substrate 401, beside and coplanar with the first set of electrodes 412. When current runs through the heater electrode 414, a constant heat source can be provided to the hot surface 403 of the thermoelectric sensor 400, which eliminates the necessity of using additional heat spreaders, or thermal interface materials.

The first and second flexible substrates 401 and 402 can be made of any suitable materials such as, for example, polyethylene, polypropylene, cellulose, etc. The thermoelectric elements 450 can include p-type and n-type thermoelectric elements such as the p-type thermoelectric elements 122 and the n-type thermoelectric elements 124 of FIG. 2C. The first and second sets of electrodes 412 and 422 can be disposed on the respective substrate surfaces by any suitable methods such as, for example, chemical deposition, physical deposition, printing, etc. The electrodes may include metals or metal alloys such as, for example, copper, aluminum, silver, silver paste, etc. The vertical or via conductor 440 can be made by filling a via through the substrate with suitable conductors such as, for example, metal alloy (e.g., tin-silver-copper) solder, silver epoxy, etc.

One or more of the thermoelectric sensors 400 can be applied as an air filtration sensor to obtain the status information of an air filter. For example, the first and second thermoelectric sensors 22 and 24 in FIG. 1 each can be the thermoelectric sensor 400. In some embodiments, at least one of the first and second substrates 401 and 402 can extend along a longitudinal direction, and a second thermoelectric sensor can be formed on the same first and/or second substrates. Similarly, a sensing circuitry or other circuitries can be formed on the same first and/or second substrates to receive and process signals from the one or more thermoelectric sensors 400.

In some embodiments, the thermoelectric sensor 300 or 400 can be positioned downstream of an air filter to face the back air flow 3 of FIG. 1. The voltage difference $\Delta V_B$ can be measured to indicate whether the air filter requires for replacement or cleaning. In some embodiments, when a suitable heating element (e.g., the heating elements shown in FIGS. 7A and 8) is disposed on the hot side of a downstream thermoelectric sensor to provide a constant heat source, measurements from that thermoelectric sensor alone (i.e., without the upstream thermoelectric sensor) might be sufficient to provide indication of the status of an air filter when the filter is under controlled and relatively stable environmental condition throughout the filter life. It is to be understood that one or more fans can be positioned upstream or down steam of the air filter to push or pull air flow through the air filter.

Figure 10A:
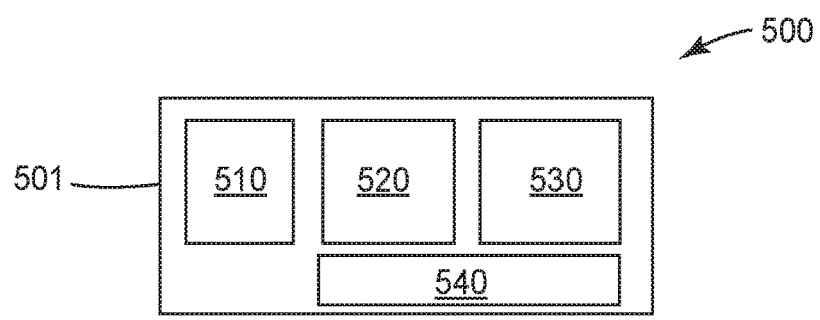
FIG. 10A is a block diagram of an air filtration sensor, according to one embodiment.

The embodiment depicted in FIG. 10A illustrates an air filtration sensor 500 including a thermoelectric sensor 510, a sensing circuitry 520, and a microprocessor 530 which can be disposed on the same flexible substrate(s) 501 and powered by the same power source (e.g., a coin cell). The sensing circuitry 520 is connected to the thermoelectric sensor 510, configured to receive and process signals from the thermoelectric sensor 510. The processed signals can be further analyzed by the microprocessor 530 to obtain status information of an air filter. The air filtration sensor 500 can further include one or more output elements 540 such as, for example, an LED light, a beeper, etc. to output the status information.

Figure 10B:
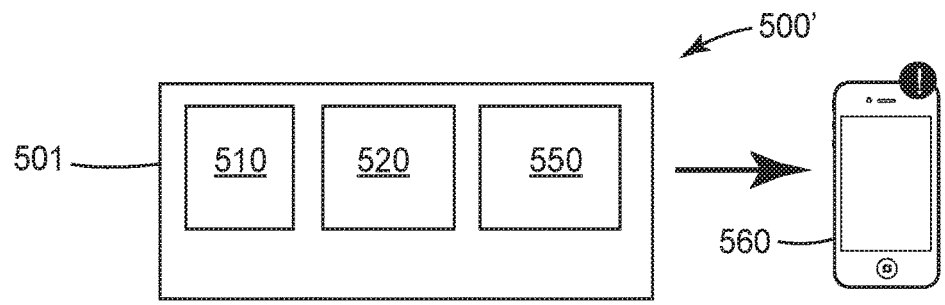
FIG. 10B is a block diagram of a wireless air filtration sensor, according to another embodiment.

The embodiment of FIG. 10B illustrates a wireless air filtration sensor 500' including a wireless component 550 connected to the sensing circuitry 520. The thermoelectric sensor 510, the sensing circuitry 520, and the wireless component 550 can be disposed on the same flexible substrate(s) 501 and powered by the same power source (e.g., a coin cell). The wireless component 550 may include, for example, a Bluetooth Low Energy (BLE) component. The wireless component 550 can be wirelessly connected to a mobile device 560 (e.g., a smartphone) for data transmission therebetween. The signal from the sensing circuitry 520 can be sent, via the wireless component 550, to the mobile device 560 which can process the signal to obtain status information of an air filter. The status information of the air filter can be output via the mobile device 560.

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

Listing of Exemplary Embodiments

Exemplary embodiments are listed below. It is to be understood that any one of embodiments 1-16, 17-23, 24-31 and 32-40 can be combined.

Embodiment 1 is an air filtration apparatus comprising:
an air filter having an inlet surface and an outlet surface, the air filter configured to filter air flowing therethrough from the inlet surface to the outlet surface;
one or more thermoelectric sensors having an upstream sensing surface and a downstream sensing surface, the upstream sensing surface being positioned adjacent the inlet surface of the air filter, and the downstream sensing surface being positioned adjacent the outlet surface of the air filter; and
sensing circuitry connected to the thermoelectric sensors, configured to receive signals from the thermoelectric sensors and process the signals to obtain status information of the air filter.

Embodiment 2 is the apparatus of embodiment 1, wherein the one or more thermoelectric sensors comprises a first thermoelectric sensor having the upstream sensing surface and a second thermoelectric sensor having the downstream sensing surface.

Embodiment 3 is the apparatus of embodiment 2, wherein the first thermoelectric sensor has the upstream sensing surface facing away from the inlet surface of the air filter.

Embodiment 4 is the apparatus of embodiment 2 or 3, wherein the second thermoelectric sensor has the downstream sensing surface facing to the outlet surface of the air filter.

Embodiment 5 is the apparatus of any one of embodiments 2-4, wherein the first and second thermoelectric sensors each have a heating element configured to heat the side of the thermoelectric sensors opposite the sensing surface.

Embodiment 6 is the apparatus of any one of embodiments 2-5, further comprising a flexible tape to support the first and second thermoelectric sensors and the sensing circuitry.

Embodiment 7 is the apparatus of embodiment 6, wherein the first and second thermoelectric sensors are disposed on opposite ends of the flexible tape.

Embodiment 8 is the apparatus of embodiment 6 or 7, wherein the sensing circuitry is disposed between the first and second thermoelectric sensors.

Embodiment 9 is the apparatus of any one of embodiments 6-8, wherein the flexible tape has a first portion connecting the first thermoelectric sensor and the sensing circuitry, and the first portion is bendable.

Embodiment 10 is the apparatus of any one of embodiments 6-9, wherein the flexible tape has a second portion connecting the second thermoelectric sensor and the sensing circuitry, and the second portion is bendable.

Embodiment 11 is the apparatus of any one of embodiments 6-10, wherein the flexible tape has an off-center portion to support the sensing circuitry, the off-center portion is attached to a periphery of the air filter, and the first and second thermoelectric sensors are positioned to be offset.

Embodiment 12 is the apparatus of embodiment 1, wherein the one or more thermoelectric sensors comprises a thermoelectric sensor having the upstream sensing surface, the downstream sensing surface, and an array of thermoelectric elements connecting the upstream and downstream sensing surfaces.

Embodiment 13 is the apparatus of embodiment 12 further comprising a heating element configured to heat the downstream sensing surface.

Embodiment 14 is the apparatus of embodiment 12 or 13, wherein the thermoelectric elements comprises a plurality of thermocouples connected in series.

Embodiment 15 is the apparatus of embodiment 14, wherein the thermocouples comprise metal wires extending through the first and outlet surfaces of the air filter.

Embodiment 16 is the apparatus of embodiment 2, wherein the first and second thermoelectric sensors have substantially the same configuration.

Embodiment 17 is a method of obtaining status information of an air filter, the method comprising:
providing one or more thermoelectric sensors having an upstream sensing surface and a downstream sensing surface, the upstream sensing surface being positioned at an upstream position of the air filter, and the downstream sensing surface being positioned at a downstream position of the air filter;
obtaining, via the thermoelectric sensors, temperature-related information representative of the difference between an upstream air velocity at the upstream position and a downstream air velocity at the downstream position; and
processing, via sensing circuitry, the temperature-related information to obtain the status information of the air filter.

Embodiment 18 is the method of embodiment 17, wherein providing one or more thermoelectric sensors comprises providing a first thermoelectric sensor having the upstream sensing surface and a second thermoelectric sensor having the downstream sensing surface.

Embodiment 19 is the method of embodiment 18, wherein obtaining the temperature-related information further comprises obtaining the difference of electric signal output from the first thermoelectric sensor and from the second thermoelectric sensor.

Embodiment 20 is the method of embodiment 18, further comprising simultaneously obtaining a first electric signal from the first thermoelectric sensor and a second electric signal from the second thermoelectric sensor.

Embodiment 21 is the method of embodiment 20, further comprising obtaining the difference between the first and second electric signals, and comparing the difference to a preset threshold.

Embodiment 22 is the method of embodiment 17, wherein providing one or more thermoelectric sensors comprises providing a thermoelectric sensor having the upstream sensing surface, the downstream sensing surface, and an array of thermoelectric elements connecting the upstream and downstream sensing surfaces.

Embodiment 23 is the method of embodiment 22, wherein obtaining the temperature-related information further comprises obtaining the voltage difference between the upstream and downstream sensing surface.

Embodiment 24 is the apparatus or method of any one of the preceding embodiments, wherein at least one of the thermoelectric sensors includes a heating element disposed on a hot side thereof, opposite to an exposed cool side.

Embodiment 25 is the apparatus or method of embodiment 24, further comprising a heater spreader disposed between the heating element and the hot side of the at least one thermoelectric sensor to uniformly distribute heat thereon.

Embodiment 26 is the apparatus or method of embodiment 25, further comprising one or more thermal interface materials on opposite sides of the heater spreader.

Embodiment 27 is apparatus or method of any one of embodiments 24-26, further comprising a thermal insulation layer to encapsulate the at least one thermoelectric sensor except for the exposed cool side.

Embodiment 28 is the apparatus or method of embodiment 24, wherein the heating element includes a pattern of heater electrode.

Embodiment 29 is the apparatus or method of embodiment 25, wherein the at least one thermoelectric sensor includes a first flexible substrate and a first set of thermoelectric electrodes disposed on the first flexible substrate, and the pattern of heater electrode is disposed on the same flexible substrate, coplanar with the first set of thermoelectric electrodes.

Embodiment 30 is the apparatus or method of embodiment 29, wherein the at least one thermoelectric sensor includes a second flexible substrate and an array of thermoelectric elements disposed between the first and second flexible substrates, a second set of thermoelectric electrodes disposed on the second flexible substrate.

Embodiment 31 is the apparatus or method of embodiment 30, wherein the at least one thermoelectric sensor includes via conductors to connect the first and second sets of thermoelectric electrodes to the thermoelectric elements.

Embodiment 32 is an air filtration apparatus comprising:
an air filter having an inlet surface and an outlet surface, the air filter configured to filter air flowing therethrough from the inlet surface to the outlet surface;
a thermoelectric sensor disposed adjacent to the outlet surface of the air filter; and
a sensing circuitry connected to the thermoelectric sensor, configured to receive signals from the thermoelectric sensors and process the signals to obtain status information of the air filter.

Embodiment 33 is the apparatus of embodiment 32, wherein the thermoelectric sensors includes a heating element disposed on a hot side thereof, opposite to an exposed cool side.

Embodiment 34 is the apparatus of embodiment 33, further comprising a heater spreader disposed between the heating element and the hot side of the at least one thermoelectric sensor to uniformly distribute heat thereon.

Embodiment 35 is the apparatus of embodiment 34, further comprising one or more thermal interface materials on opposite sides of the heater spreader.

Embodiment 36 is apparatus of any one of embodiments 24-26, further comprising a thermal insulation layer to encapsulate the at least one thermoelectric sensor except for the exposed cool side.

Embodiment 37 is the apparatus of embodiment 32, wherein the heating element includes a pattern of heater electrode.

Embodiment 38 is the apparatus of embodiment 37, wherein the thermoelectric sensor includes a first flexible substrate and a first set of thermoelectric electrodes disposed on the first flexible substrate, and the pattern of heater electrode is disposed on the same first flexible substrate, coplanar with the first set of thermoelectric electrodes.

Embodiment 39 is the apparatus of embodiment 38, wherein the thermoelectric sensor includes a second flexible substrate and an array of thermoelectric elements disposed between the first and second flexible substrates, a second set of thermoelectric electrodes disposed on the second flexible substrate.

Embodiment 40 is the apparatus of embodiment 39, wherein the thermoelectric sensor includes via conductors to connect the first and second sets of thermoelectric electrodes to the thermoelectric elements.

Reference throughout this specification to "one embodiment," "certain embodiments," "one or more embodiments," or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment," or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, various exemplary embodiments have been described. These and other embodiments are within the scope of the following claims.

What is claimed is:

1. An air filtration apparatus comprising:
   an air filter having an inlet surface and an outlet surface, the air filter configured to filter air flowing therethrough from the inlet surface to the outlet surface;
   one or more thermoelectric sensors having an upstream sensing surface and a downstream sensing surface, the upstream sensing surface being positioned adjacent the inlet surface of the air filter, and the downstream sensing surface being positioned adjacent the outlet surface of the air filter;
   sensing circuitry connected to the thermoelectric sensors, configured to receive signals from the thermoelectric sensors and process the signals to obtain status information of the air filter; and
   a flexible substrate to support the one or more thermoelectric sensors and the sensing circuitry, the flexible substrate including first and second portions connected by an off-center portion, the first and second portions respectively connecting the upstream sensing surface and the downstream sensing surface to the sensing circuitry supported by the off-center portion, and the first and second portions are bendable to face with respect to each such that the upstream sensing surface and the downstream sensing surface are positioned to be offset with respect to the off-center portion and the downstream sensing surface is not blocked by the upstream sensing surface.

2. The apparatus of claim 1, wherein the one or more thermoelectric sensors comprises a first thermoelectric sensor having the upstream sensing surface and a second thermoelectric sensor having the downstream sensing surface.

3. The apparatus of claim 2, wherein the first thermoelectric sensor has the upstream sensing surface facing away from the inlet surface of the air filter.

4. The apparatus of claim 2, wherein the second thermoelectric sensor has the downstream sensing surface facing to the outlet surface of the air filter.

5. The apparatus of claim 2, wherein the flexible substrate supports the first and second thermoelectric sensors and the sensing circuitry.

6. The apparatus of claim 5, wherein the sensing circuitry is disposed between the first and second thermoelectric sensors.

7. The apparatus of claim 5, wherein the flexible substrate has the first portion connecting the first thermoelectric sensor and the sensing circuitry.

8. The apparatus of claim 5, wherein the flexible substrate has the second portion connecting the second thermoelectric sensor and the sensing circuitry.

9. The apparatus of claim 5, wherein the off-center portion is attached to a periphery of the air filter, and the first and second thermoelectric sensors are positioned to be offset.

10. The apparatus of claim 1, wherein the one or more thermoelectric sensors comprises a thermoelectric sensor having the upstream sensing surface, the downstream sensing surface, and an array of thermoelectric elements connecting the upstream and downstream sensing surfaces.

11. The apparatus of claim 10, wherein the thermoelectric elements comprise a plurality of thermocouples connected in series.

12. The apparatus of claim 11, wherein the thermocouples comprise conductor wires at least partially extending through the air filter.

13. The apparatus of claim 1, wherein at least one of the thermoelectric sensors includes a heating element disposed on a hot side thereof, opposite to an exposed cool side.

14. A method of obtaining status information of an air filter, the method comprising:
    providing one or more thermoelectric sensors having an upstream sensing surface and a downstream sensing surface, the upstream sensing surface being positioned at an upstream position of the air filter, and the downstream sensing surface being positioned at a downstream position of the air filter, wherein a flexible substrate supports the one or more thermoelectric sensors and the sensing circuitry, the flexible substrate including first and second portions connected by an off-center portion, the first and second portions respectively connecting the upstream sensing surface and the downstream sensing surface to the sensing circuitry supported by the off-center portion, and the first and second portions are bendable to face with respect to each such that the upstream sensing surface and the downstream sensing surface are positioned to be offset with respect to the off-center portion and the downstream sensing surface is not blocked by the upstream sensing surface;
    obtaining, via the thermoelectric sensors, temperature-related information representative of the difference between an upstream air flow property at the upstream position and a downstream air flow property at the downstream position; and
    processing, via sensing circuitry, the temperature-related information to obtain the status information of the air filter.

15. The method of claim 14, wherein providing one or more thermoelectric sensors comprises providing a first thermoelectric sensor having the upstream sensing surface and a second thermoelectric sensor having the downstream sensing surface.

16. The method of claim 15, wherein obtaining the temperature-related information further comprises obtaining the difference of electric signal outputs from the first thermoelectric sensor and from the second thermoelectric sensor.

17. The method of claim 15, further comprising simultaneously obtaining a first electric signal from the first thermoelectric sensor and a second electric signal from the second thermoelectric sensor.

18. The method of claim 17, further comprising obtaining the difference between the first and second electric signals, and comparing the difference to a preset threshold.

19. The method of claim 14, wherein providing one or more thermoelectric sensors comprises providing a thermoelectric sensor having the upstream sensing surface, the downstream sensing surface, and an array of thermoelectric elements connecting the upstream and downstream sensing surfaces.

20. The method of claim 19, wherein obtaining the temperature-related information further comprises obtaining the voltage difference between the upstream and downstream sensing surface.

* * * * *